United States Patent
Imada (10) Patent No.: US 9,071,757 B2
(45) Date of Patent: Jun. 30, 2015

(54) OPTICAL IMAGE STABILIZER AND OPTICAL APPARATUS

(71) Applicant: CANON KABUSHIKI KAISHA, Tokyo (JP)

(72) Inventor: Shinji Imada, Saitama (JP)

(73) Assignee: CANON KABUSHIKI KAISHA (JP)

( * ) Notice: Subject to any disclaimer, the term of this patent is extended or adjusted under 35 U.S.C. 154(b) by 197 days.

(21) Appl. No.: 13/705,879

(22) Filed: Dec. 5, 2012

(65) Prior Publication Data

US 2013/0141603 A1    Jun. 6, 2013

(30) Foreign Application Priority Data

Dec. 6, 2011    (JP) .................................. 2011-267383

(51) Int. Cl.
*H04N 5/228*    (2006.01)
*G03B 17/00*    (2006.01)
*G02B 27/64*    (2006.01)
*H04N 5/232*    (2006.01)

(52) U.S. Cl.
CPC ....... *H04N 5/23287* (2013.01); *H04N 5/23254* (2013.01); *G02B 27/646* (2013.01); *G03B 2205/0015* (2013.01); *H04N 5/23258* (2013.01); *H04N 5/2328* (2013.01)

(58) Field of Classification Search
CPC ............... H04N 5/228; H04N 5/23287; G03B 2205/0007; G03B 2205/0015; G02B 27/64; G02B 27/646
USPC ......... 348/208.1–208.16, 208.99; 396/52–55; 359/554–557
See application file for complete search history.

(56) References Cited

U.S. PATENT DOCUMENTS

| 5,973,319 | A  | * | 10/1999 | Washisu ................. 250/231.13 |
|---|---|---|---|---|
| 6,097,896 | A  | * | 8/2000 | Usui ............................. 396/55 |
| 6,173,121 | B1 | * | 1/2001 | Tomita et al. ................ 396/52 |
| 7,292,270 | B2 | * | 11/2007 | Higurashi et al. ......... 348/208.3 |
| 7,590,336 | B2 | * | 9/2009 | Higo ............................. 396/55 |
| 7,962,024 | B2 | * | 6/2011 | Tsuchihashi ................ 396/55 |
| 2008/0037970 | A1 | * | 2/2008 | Saito et al. .................. 396/55 |
| 2011/0013031 | A1 | * | 1/2011 | Miyasako ............... 348/208.99 |
| 2011/0194847 | A1 | * | 8/2011 | Wakamatsu ................ 396/55 |

FOREIGN PATENT DOCUMENTS

JP    2010-139694 A    6/2010

* cited by examiner

*Primary Examiner* — Sinh Tran
*Assistant Examiner* — Mark Monk
(74) *Attorney, Agent, or Firm* — Rossi, Kimms & McDowell LLP (57) ABSTRACT

The optical image stabilizer sets a movable amount of an image stabilizing element to a first movable amount when a detection signal from a shake detector does not exceed a first value. The stabilizer sets the movable amount to a second movable amount when the signal exceeds the first value and then exceeds, without exceeding a second value, a third value within a first period of time, sets the movable amount to a third movable amount when the signal exceeds the first value and then does not exceed the second and third values, sets the movable amount to the second movable amount when the signal exceeds the first value, then exceeds the second value and thereafter exceeds a fourth value, and sets the movable amount to the third movable amount when the signal exceeds the first value and then exceeds the second value without exceeding the fourth value.

10 Claims, 8 Drawing Sheets

(PRIOR ART)

FIG. 7C

# OPTICAL IMAGE STABILIZER AND OPTICAL APPARATUS

BACKGROUND OF THE INVENTION

1. Field of the Invention

The present invention relates to an optical image stabilizer to be used for optical apparatuses such as video cameras and interchangeable lenses.

2. Description of the Related Art

Optical image stabilizers are operable to move (shift) an image stabilizing lens that constitutes part of an image capturing optical system or an image sensor that photoelectrically converts an object image formed by the image capturing optical system in directions orthogonal to an optical axis of the image capturing optical system in response to a shake of an optical apparatus to correct (or reduce) image blur caused by the shake of the optical apparatus. The shake of the optical apparatus is detected by a shake detector such as an angular velocity sensor provided in the optical apparatus. Shift drive of the image stabilizing lens or the image sensor enables correction of the image blur. The image stabilizing lens and the image sensor are hereinafter collectively referred to as "an image stabilizing element".

Japanese Patent Laid-Open No. 2010-139694 discloses one of such optical image stabilizers which determines whether or not magnitude of the shake exceeds a predetermined level and whether or not panning is being performed and which changes a movable amount of the image stabilizing element according to a result of the determination. Specifically, this optical image stabilizer sets a larger movable amount in a case where the magnitude of the shake exceeds the predetermined level and the panning is not being performed as compared with other cases. Accordingly, the optical image stabilizer sets such a larger movable amount of the image stabilizing element in a case where the magnitude of the shake is large because a user performs image capturing while walking as compared with a case where the user performs image capturing in a resting state, thereby improving image stabilization performance. On the other hand, the optical image stabilizer sets a smaller movable amount of the image stabilizing element in a case where the user performs image capturing with panning as compared with the case where the user performs image capturing while walking, thereby avoiding deterioration of image quality due to a large shift of the image stabilizing element during the image capturing with panning.

However, the optical image stabilizer disclosed in Japanese Patent Laid-Open No. 2010-139694 may determine that, when fast panning is performed, a shake is generated not due to the panning, but due to the walking, and therefore may set a large movable amount of the image stabilizing element.

Figure 7A:
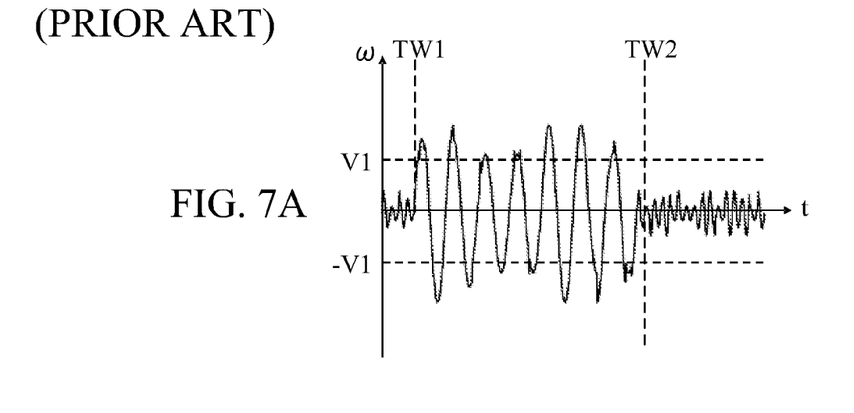
FIGS. 7A to 7C show waveforms of a shake detection signal in mutually different image capturing states in a prior art.

FIG. 7A shows an example of a shake detection signal (angular velocity signal) showing a shake of an optical apparatus used while a user is walking. In FIG. 7A (and FIGS. 7B and 7C), a vertical axis shows value of the shake detection signal (angular velocity ω) and a horizontal axis shows time t. FIG. 7A shows a state where the user is not walking until a time TW1 and a state where the user is walking from the time TW1 to a time TW2. FIG. 7A further shows, after the time TW2, a state where the user is not walking again. When the user starts walking at the time TW1, the value of the shake detection signal exceeds a predetermined value V1, and thereafter a polarity (sign) of the shake detection signal reverses and the value thereof exceeds a predetermined value −V1. While the user is walking, the polarity of the shake detection signal alternately reverses and the values thereof exceeding the predetermined values V1 and −V1 are output.

Figure 7B:
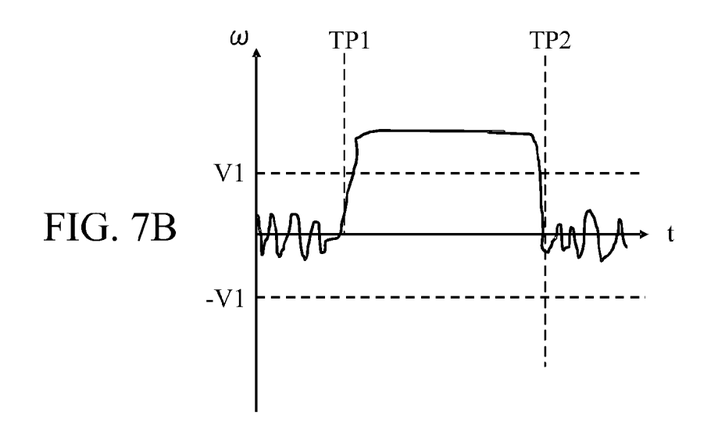

FIG. 7B shows an example of the shake detection signal when slow panning is performed. The panning is started at a time TP1, and the panning is ended at a time TP2. When the slow panning is performed, the value of the shake detection signal exceeds the predetermined value V1, but the polarity thereof does not alternately reverse, which makes it possible to distinguish a shake generated by the slow panning from a shake generated during the walking.

Figure 7C:
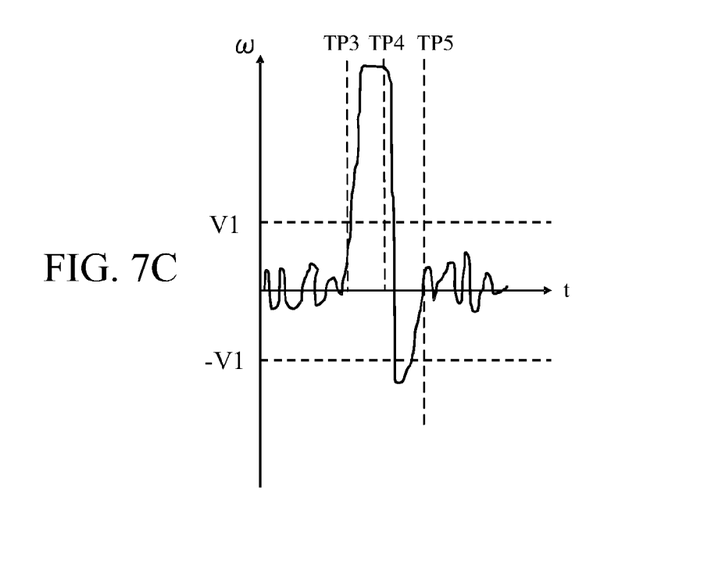

FIG. 7C shows an example of the shake detection signal when fast panning is performed. The fast panning is often performed so as to pass over an object once and then return to the object again. After the fast panning is started at a time TP3, the value of the shake detection signal exceeds the predetermined value V1. Then, the panning is performed so as to pass over the object once at a time TP4, is reversed in direction to return to the object and is thereafter ended at a time TP5.

In image capturing while such fast panning is performed, the polarity of the shake detection signal reverses after the value thereof exceeds the predetermined value V1 and then the value thereof exceeds the predetermined value −V1, which may cause erroneous detection that the image capturing with fast panning is determined as the image capturing while walking. Such erroneous detection causes setting of a larger movable amount of the image stabilizing element than a movable amount that should be set small during the image capturing with fast panning, which deteriorates image quality due to a large shift of the image stabilizing element during the image capturing with fast panning.

SUMMARY OF THE INVENTION

The present invention provides an optical image stabilizer capable of avoiding that the movable amount of the image stabilizing element is set large when the image capturing with fast panning is performed, as well as when the image capturing while walking is performed, and provides an optical apparatus provided with the same.

The present invention provides as one aspect thereof an optical image stabilizer configured to move an image stabilizing element in order to reduce image blur caused by a shake of an optical apparatus provided with the optical image stabilizer. The optical image stabilizer includes a shake detector configured to output a detection signal corresponding to magnitude of the shake of the optical apparatus, and a controller configured to change a movable amount of the image stabilizing element from a center of its movable range according to a value of the detection signal. The controller is configured to set the movable amount to a first movable amount when the value of the detection signal does not exceed a first value, to set the movable amount to a second movable amount larger than the first movable amount when the value of the detection signal exceeds the first value and then exceeds, without exceeding a second value whose polarity is same as that of the first value and whose absolute value is greater than that of the first value, a third value whose polarity is opposite to that of the first value within a first period of time, to set the movable amount to a third movable amount equal to or smaller than the first movable amount when the value of the detection signal exceeds the first value and then does not exceed the second and third values within the first period of time, to set the movable amount to the second movable amount when the value of the detection signal exceeds the first value, then exceeds the second value and thereafter exceeds a fourth value whose polarity is opposite to that of the second value and whose absolute value is greater than that of the third value within the first period of time, and to set the movable amount to the third movable amount when the value of the detection signal exceeds the first value and then exceeds the second value without exceeding the fourth value within the first period of time.

The present invention provides as another aspect thereof an optical apparatus provided with the above optical image stabilizer.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
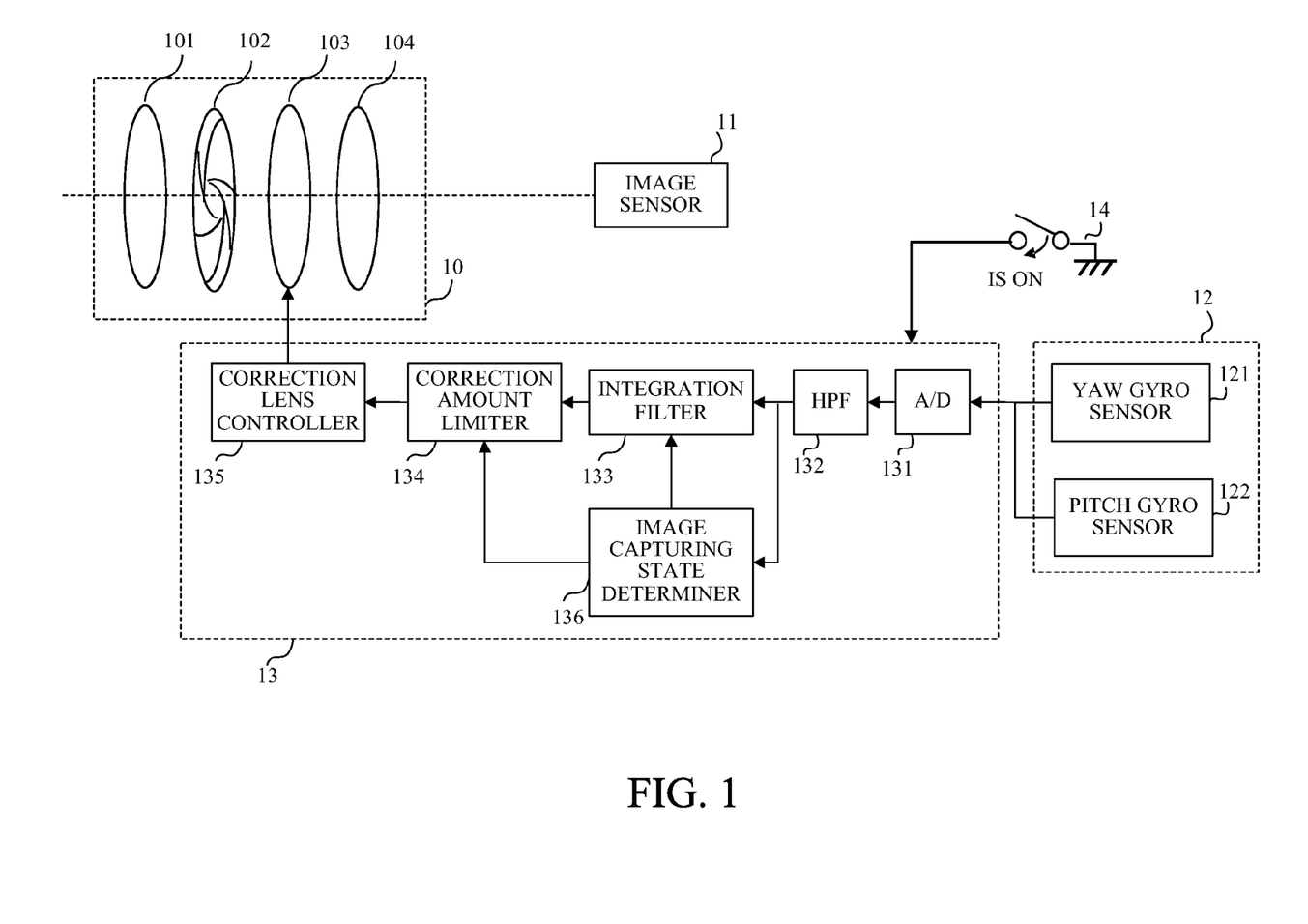
FIG. 1 is a block diagram showing a configuration of a camera provided with an optical image stabilizer that is Embodiment 1 of the present invention.

FIG. 1 shows a configuration of a camera (such as a video camera or a digital still camera) as an optical apparatus provided with an optical image stabilizer that is a first embodiment (Embodiment 1) of the present invention. Reference numeral 10 denotes an image capturing optical system that includes, in order from an object side (left side in FIG. 1), a magnification-varying lens 101, an aperture stop 102, a correction lens 103 as an image stabilizing element and a focus lens 104. The image capturing optical system 10 causes light from an object (not shown) to form an object image. The object image is photoelectrically converted by an image sensor 11 constituted by a photoelectric conversion element such as a CMOS sensor or a CCD sensor. The correction lens 103 is moved (shifted) in directions orthogonal to an optical axis of the image capturing optical system 10 to correct (or reduce) image blur that is blur of the object image formed on the image sensor 11.

The correction lens 103 may be swung about a point on the optical axis so as to be moved in the directions orthogonal to the optical axis (that is, such that the directions orthogonal to the optical axis are included as components of movement directions of the correction lens 103).

Reference numeral 12 denotes a shake sensor (shake detector) constituted by an angular velocity sensor such as a gyro sensor. The shake sensor 12 outputs an angular velocity signal having magnitude corresponding to a shake of the camera (hereinafter referred to as "a camera shake"). The magnitude of the camera shake in this embodiment means magnitude of the camera shake per unit time. The camera in this embodiment is provided with, as the shake sensor 12, a yaw gyro sensor 121 that detects a horizontal rotational camera shake (camera shake in a yaw direction) and a pitch gyro sensor 122 that detects a vertical rotational camera shake (camera shake in a pitch direction). As the shake sensor 12, a single shake sensor may be used which can detect both the camera shake in the yaw and pitch directions, or a shake sensor may be used which can detect not only the camera shake in the yaw and pitch directions but also a camera shake in a direction in which the optical axis extends (that is, in an optical axis direction).

The angular velocity signal from the shake sensor 12 (121 and 122) is input to an A/D converter 131 provided in an image stabilization processor 13 to be converted thereby into a digital signal. An image stabilization (IS) ON/OFF switch 14 is connected to the image stabilization processor 13. A user's ON operation of the IS ON/OFF switch 14 causes the image stabilization processor 13 to perform an image stabilization operation, which will be described later. When the IS ON/OFF switch 14 is in an OFF state, the image stabilization processor 13 does not perform the image stabilization operation.

Next, description will be made of the image stabilization process performed by the image stabilization processor 13 serving as a controller. The angular velocity signal converted into the digital signal by the A/D converter 131 passes through a high-pass filter (HPF) and thereby its DC component is cut. The angular velocity signal whose DC component has been cut is input to an integration filter 133 to be integrated thereby and converted into an angular displacement signal showing an angular displacement amount (camera shake amount). The angular displacement signal is input to a correction amount limiter 134. The correction amount limiter 134 calculates a shift drive amount of the correction lens 103 (hereinafter referred to as "a lens correction amount") from the angular displacement signal, and changes a limit value that is a maximum allowable value of the lens correction amount. The limit value corresponds to a movable amount of the correction lens 103.

An image capturing state determiner 136 determines a current image capturing state such as a resting image capturing state, a panning image capturing state and a walking image capturing state, from value (angular velocity) or frequency of the angular velocity signal that has passed through the high-pass filter (HPF) 132. A result of the determination is input to the integration filter 133 and the correction amount limiter 134. The integration filter 133 and the correction amount limiter 134 respectively change an integration filter characteristic and the limit value depending on the input determination result, though described later in detail.

A correction lens controller 135 performs shift drive of the correction lens 103 in a direction in which the image blur is canceled out among the directions orthogonal to the optical axis in response to a signal showing the lens correction amount and being output from the correction amount limiter 134. Actually, the correction lens controller 135 controls energization of an actuator such as a voice coil motor that drives the correction lens 103.

Figure 2:
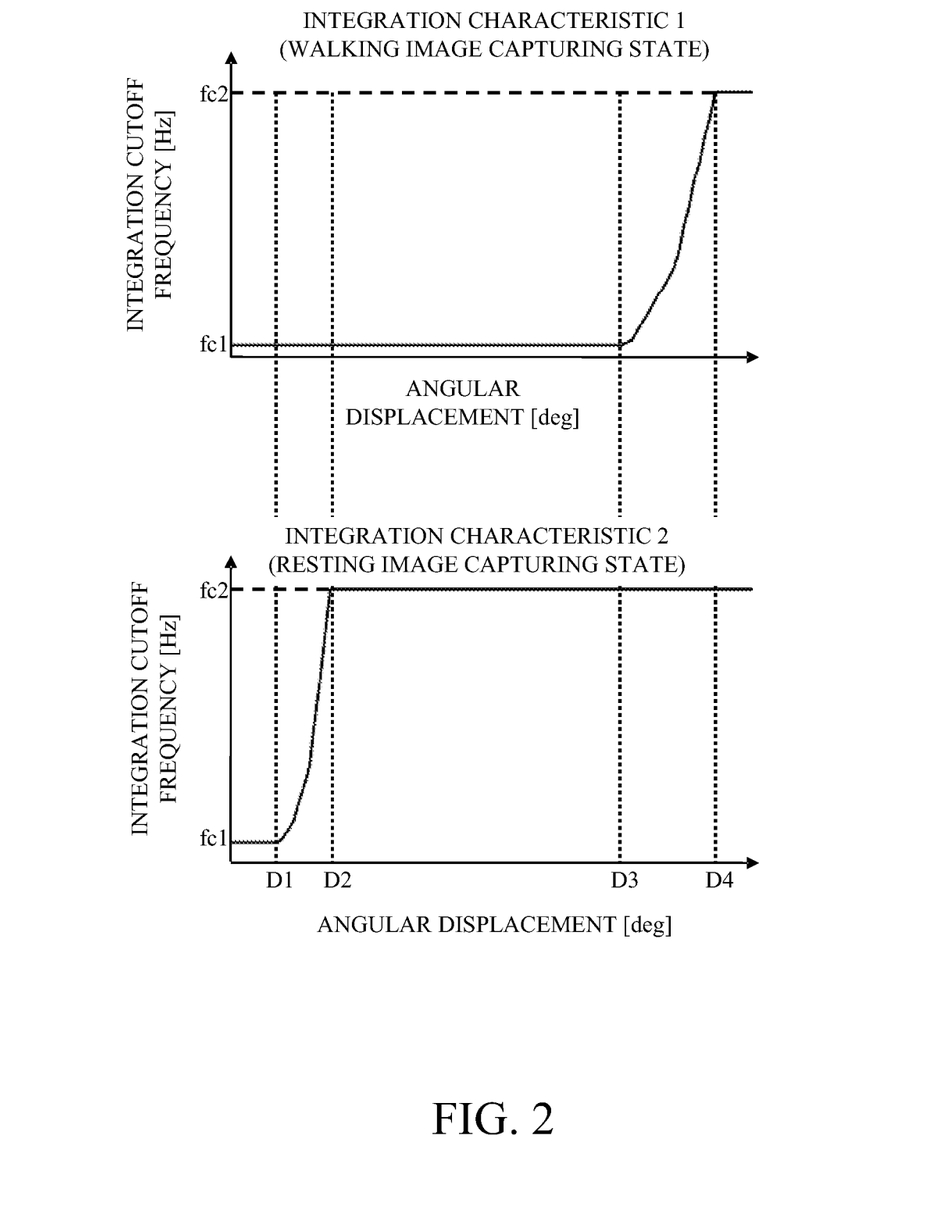
FIG. 2 shows integration filter characteristics of the optical image stabilizer of Embodiment 1.

FIG. 2 shows integration filter characteristics (shown as integration characteristics 1 and 2 in the figure) changeable in the integration filter 133. Both the integration characteristics 1 and provide a lowest cutoff frequency of fc1 and a highest cutoff frequency of fc2. Reference characters D1, D2, D3 and D4 denote angular displacement amounts of the camera shake having a relationship of D1<D2<D3<D4.

The integration characteristic 1 is a characteristic in which its cutoff frequency is set to the lowest cutoff frequency fc1 until the angular displacement amount reaches D3, then gradually increases as the angular displacement amount increases from the D3 and finally reaches the highest cutoff frequency fc2 when the angular displacement amount increases to D4.

On the other hand, the integration characteristic 2 is a characteristic in which its cutoff frequency is set to the lowest cutoff frequency fc1 until the angular displacement amount reaches D1, then gradually increases as the angular displacement amount increases from the D1 and finally reaches the highest cutoff frequency fc2 when the angular displacement amount increases to D2. In the integration characteristic 2, the cutoff frequency is maintained to the highest cutoff frequency fc2 for the angular displacement amount larger than D2.

Increase of the cutoff frequency decreases the movable amount of the correction lens 103, in other words, narrows a movable range of the correction lens 103. The movable amount of the correction lens 103 means a possible shift amount of the correction lens 103 with respect to a shift center of the correction lens 103 located on the optical axis of the image capturing optical system 10.

Setting the integration characteristic 2 increases the cutoff frequency from a small angular displacement amount, and thereby the movable amount of the correction lens 103 is set to a first movable amount as a small movable amount. On the other hand, setting the integration characteristic 1 keeps the cutoff frequency low until the angular displacement amount becomes large, and thereby the movable amount of the correction lens 103 is set to a second movable amount larger than the first movable amount.

In this embodiment, the integration filter 133 sets the integration characteristic 2 when the image capturing state determiner 136 determines that the current image capturing state is the resting image capturing state in which a user performs image capturing with the camera in his/her hand at rest without walking (moving). On the other hand, the integration filter 133 sets the integration characteristic 1 when the image capturing state determiner 136 determines that the current image capturing state is the walking image capturing state in which the user performs image capturing while walking. The setting of the integration characteristic 1 enables provision of a sufficient large movable amount of the correction lens 103 for a larger camera shake caused by the user's walking than that provided in the resting image capturing state, which can ensure good image stabilization performance.

Moreover, the correction amount limiter 134 sets the movable amount of the correction lens 103 to a third movable amount when the image capturing state determiner 136 determines that the current image capturing state is the panning image capturing state in which the user performs image capturing with panning in the yaw direction or tilting in the pitch direction to turn the camera so as to follow a moving object. The panning and tilting are hereinafter collectively referred to as "panning". The third movable amount may be set to be smaller than the first movable amount, or may be set to be equal to the first movable amount by using the integration characteristic 2. Setting of the third movable amount enables avoidance of image quality deterioration of a captured image which is caused by a large shift of the correction lens 103 with respect to the panning similar to the camera shake in the walking image capturing state. The third movable amount may be set to zero such that the correction lens 103 is fixed at its shift center in the panning image capturing state.

Although this embodiment describes the case of changing the movable amount of the correction lens 103 by changing the integration filter characteristic according to the image capturing state, the movable amount thereof may be changed by using other electrical and mechanical methods.

Figure 4A:
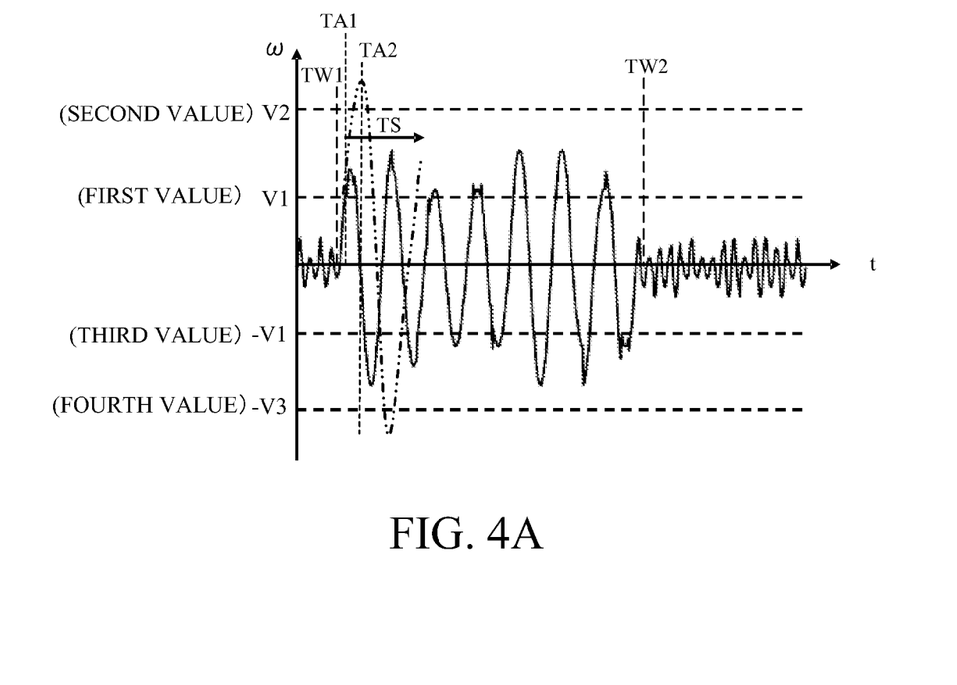
FIGS. 4A to 4C show waveforms of a shake detection signal in mutually different image capturing states in Embodiment 1.

FIG. 4A shows an example of the angular velocity signal showing a camera shake in the walking image capturing state. In FIG. 4A (and FIGS. 4B and 4C), a vertical axis shows angular velocity ω and a horizontal axis shows time t.

FIG. 4A shows the resting image capturing state until a time TW1, and shows the walking image capturing state from the time TW1 to a time TW2. FIG. 4A again shows, after the time TW2, the resting image capturing state. In the resting image capturing state, the angular velocity ω changes in response to a camera shake caused by user's hand jiggling within a range not exceeding V1 (first value) and −V1 (third value) having an opposite polarity to that of V1.

After the walking image capturing state is started at the time TW1, the angular velocity ω exceeds V1 at a time TA1 due to the camera shake caused by motion of user's walking. Thereafter, the angular velocity ω does not exceed V2 (second value) whose polarity is same as that of V1 and whose absolute value is greater than that of V1, and exceeds −V1 at a time TA2 within a predetermined period of time (first period of time) TS from the time TA1. In the walking image capturing state, the angular velocity ω exceeds V1 and −V1 with such alternately reversing polarities.

However, in the same walking image capturing state, when the user walks fast or runs, the angular velocity ω is significantly changed with its polarity reversed, as shown by a dashed-two dotted line in FIG. 4A. That is, after such a fast walking (running) image capturing state is started at the time TW1, the angular velocity ω exceeds V1 at the time TA1, then exceeds V2 within the predetermined period of time TS from the time TA1 and further exceeds −V3 (fourth value) whose polarity is opposite to that of V2 and whose absolute value is greater than that of −V1.

Figure 4B:
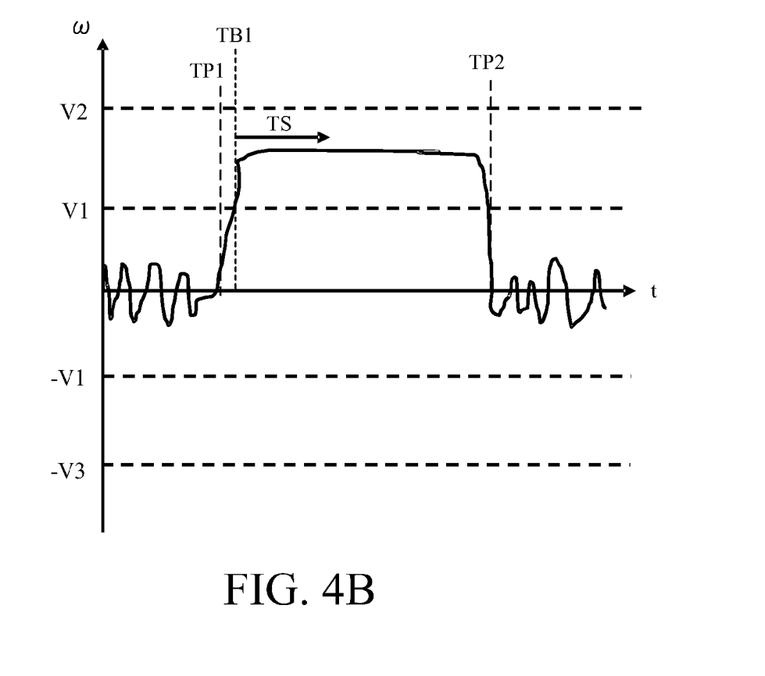

FIG. 4B shows an example of the angular velocity signal in the panning image capturing state in which slow panning is performed. The slow panning is started at a time TP1 and then is ended at a time TP2. In the slow panning, the angular velocity ω exceeds V1 at a time TB1, but a reverse of its polarity which causes the angular velocity ω to exceed −V1 within the predetermined period of time TS from the time TB1, which is caused in the walking image capturing state, is not caused.

Figure 4C:
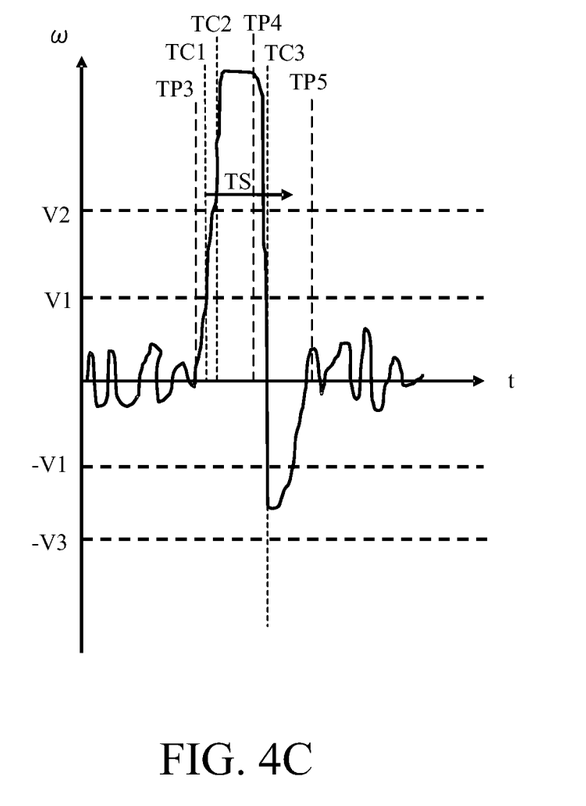

FIG. 4C shows an example of the angular velocity signal in the panning image capturing state in which fast panning is performed. The fast panning is started at a time TP3, passes over an object once, reverses its direction at a time TP4 and then returns to the object to be ended at a time TP5. In such fast panning, the angular velocity ω exceeds V1 at a time TC1 and then exceeds V2 within the predetermined period of time TS from the time TC1. However, the angular velocity ω falls within a range between V1 and −V1 within the predetermined period of time TS from the time TC1 without exceeding −V3.

Next, description will be made of an image capturing state determination process performed by the image capturing state determiner 136 for determining the current image capturing state, with reference to a flowchart shown in FIG. 3. The image capturing state determiner 136 (image stabilization processor 13) performs this image capturing state determination process according to part of an image stabilization process program described later.

The image capturing state determiner 136 determines the image capturing state by using the angular velocity signal after passing the HPF 132. This is to remove the DC component (offset component) generated from the shake sensor 12 without any relation to the camera shake in order to perform more accurate determination of the image capturing state.

The image capturing state determiner 136 starts the image capturing state determination process at step S301, and then determines whether or not the angular velocity ω that is the value of the angular velocity signal exceeds a threshold V1 (first value) at step S302. If the angular velocity ω does not exceed the threshold V1, the image capturing state determiner 136 proceeds to step S303 to reset a counter for measuring time after the angular velocity ω exceeds the threshold V1. Then, the image capturing state determiner 136 proceeds to step S304 to determine that the current image capturing state is the resting image capturing state.

On the other hand, if determining that the angular velocity ω exceeds the threshold V1 at step S302, the image capturing state determiner 136 causes the above-mentioned counter to start counting of time at step S305. Then, at step S306, the image capturing state determiner 136 determines whether or not the angular velocity ω exceeds a threshold V2 (second value) whose polarity (or sign) is same as that of the threshold V1 and whose absolute value is greater than that of the threshold V1.

If the angular velocity ω does not exceed the threshold V2, the image capturing state determiner 136 proceeds to step S310 to determine whether or not a counted time counted by the counter is within the predetermined period of time (first period of time) TS and whether or not the angular velocity ω exceeds a threshold −V1 (third value) whose polarity is opposite to that of the threshold V1. An absolute value of the threshold −V1 may be equal to or different from (close to) that of the threshold V1. If the angular velocity ω exceeds the threshold −V1, the image capturing state determiner 136 proceeds to step S311 to determine that the current image capturing state is the walking image capturing state. On the other hand, if the angular velocity ω does not exceed the threshold −V1, the image capturing state determiner 136 proceeds to step S312 to determine that the current image capturing state is the panning image capturing state.

If the angular velocity ω exceeds the threshold V2 at step S306, the image capturing state determiner 136 proceeds to step S307 to determine whether or not the counted time counted by the counter is within the predetermined period of time TS and whether or not the angular velocity ω exceeds a threshold −V3 (fourth value) whose polarity is opposite to that of the threshold V2 and whose absolute value is greater than that of the threshold −V1. The absolute value of the threshold −V3 may be equal to or different from (close to) that of the threshold V2. If the angular velocity ω exceeds the threshold −V3, the image capturing state determiner 136 proceeds to step S308 to determine that the current image capturing state is the walking image capturing state. On the other hand, if the angular velocity ω does not exceed the threshold −V3, the image capturing state determiner 136 proceeds to step S309 to determine that the current image capturing state is the panning (fast panning) image capturing state.

Next, description will be made of an image stabilization control operation performed by the image stabilization processor 13 according to the above-described determination result by the image capturing state determiner 136, with reference to a flowchart shown in FIG. 5. The image stabilization processor 13 performs this image stabilization control operation according to the above-mentioned image stabilization process program as a computer program stored in a memory (not shown).

After starting the image stabilization control operation at step S501, the image stabilization processor 13 causes the A/D converter 131 to convert the angular velocity signal output from the shake sensor 12 into the digital signal at step S502. Then, the image stabilization processor 13 proceeds to step S503 to cause the high-pass filter (HPF) to cut the DC component included in the digital angular velocity signal.

Next, at step S504, the image stabilization processor 13 determines whether or not the current image capturing state has been determined by the image capturing state determiner 136 to be the walking image capturing state. If the current image capturing state has been determined to be the walking image capturing state, the image stabilization processor 13 proceeds to step S505 to cause the integration filter 133 to perform the above-mentioned integration process with the integration characteristic 1 shown in FIG. 2. Moreover, at step S506, the image stabilization processor 13 sets the limit value of the lens correction amount to a limit value 2 that is a maximum limit value. As a result, the movable amount of the correction lens 103 is set to the second movable amount. Then, the image stabilization processor 13 proceeds to step S512 to cause the correction lens controller 135 to start drive control of the correction lens 103. The setting of the second movable amount makes it possible to set a large movable amount of the correction lens 103 corresponding to a large camera shake in the walking image capturing state, which enables good correction of image blur caused by the large camera shake.

On the other hand, if determining that the current image capturing state has been determined not to be the walking image capturing state at step S504, the image stabilization processor 13 proceeds to step S507 to determine whether or not the current image capturing state has been determined to be the panning image capturing state. If determining that the current image capturing state has not been determined to be the panning image capturing state at this step, the image stabilization processor 13 regards the current image capturing state as the resting image capturing state and proceeds to step S508.

At step S508, the image stabilization processor 13 causes the integration filter 133 to perform the integration process with the integration characteristic 2 shown in FIG. 2. Moreover, at step S509, the image stabilization processor 13 sets the limit value of the lens correction amount to a limit value 1 smaller than the limit value 2. As a result, the movable amount of the correction lens 103 is set to the first movable amount. Then, the image stabilization processor 13 proceeds to step S512 to cause the correction lens controller 135 to start the drive control of the correction lens 103. The setting of the first movable amount enables good correction of image blur caused by a camera shake due to user's hand jiggling in the resting image capturing state.

If determining at step S507 that the current image capturing state has been determined to be the panning image capturing state, the image stabilization processor 13 proceeds to step S510 to cause the integration filter 133 to perform the integration process with the integration characteristic 2. Moreover, at step S511, the image stabilization processor 13 sets the limit value of the lens correction amount to a limit value 3 smaller than the limit value 2. As a result, the movable amount of the correction lens 103 is set to the third movable amount. Then, the image stabilization processor 13 proceeds to step S512 to cause the correction lens controller 135 to start the drive control of the correction lens 103. The setting of the third movable amount enables avoidance of image quality deterioration due to a large shift drive of the correction lens 103 in the panning image capturing state.

As described above, this embodiment can determine the current image capturing state with good accuracy and thereby can set the movable amounts of the correction lens 103 appropriate for the respective image capturing states. In particular, this embodiment sets a larger movable amount of the correction lens 103 in the walking image capturing state than that in the resting image capturing state and thereby can correct even a large image blur that may be caused in the walking image capturing state. On the other hand, this embodiment can prevent erroneous determination that the fast panning image capturing state is determined as the walking image capturing state and thus can avoid the image quality deterioration due to the large shift drive of the correction lens 103 corresponding to the fast panning.

Figure 3:
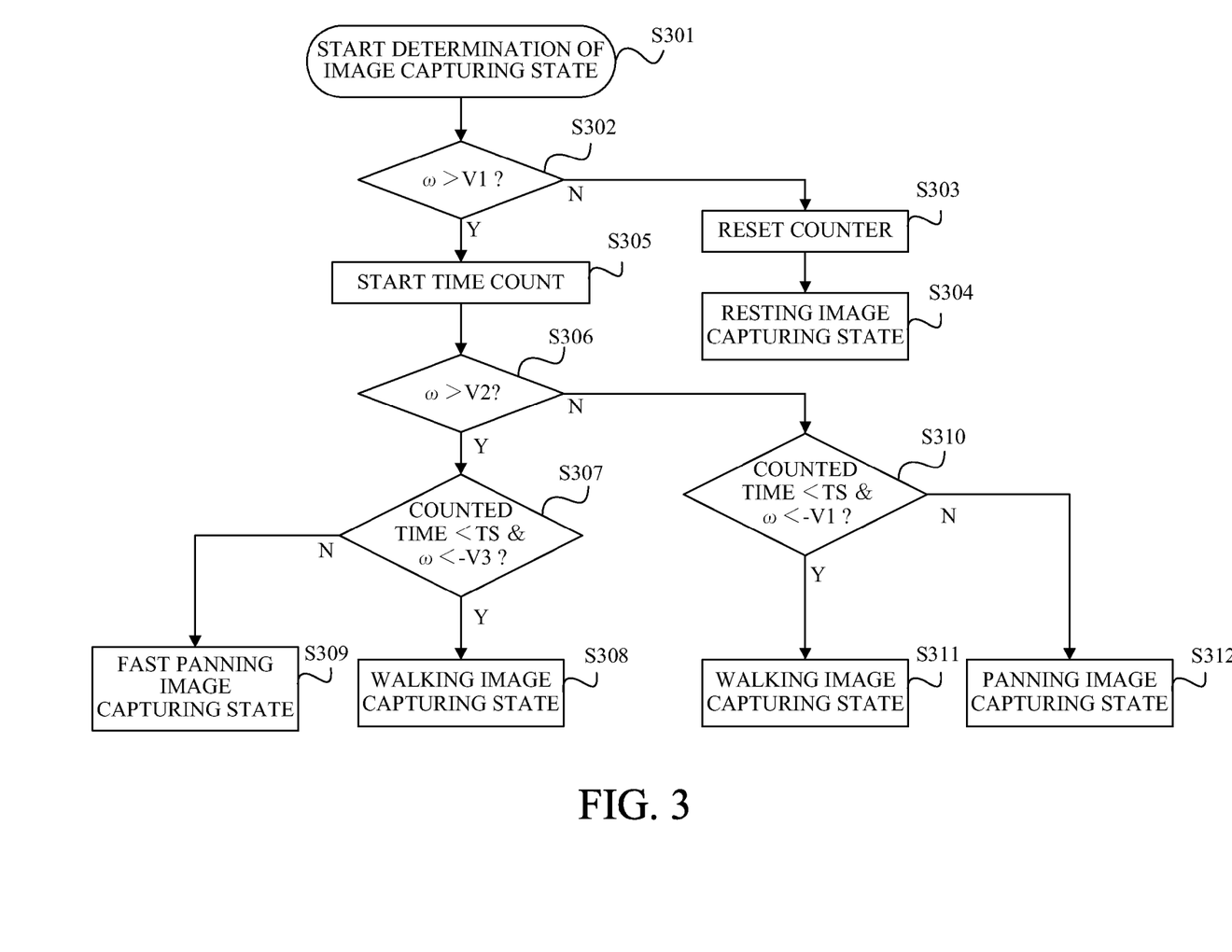
FIG. 3 is a flowchart showing an image capturing state determination process in Embodiment 1.

Although this embodiment described the case of setting the movable amount of the correction lens 103 after determining the image capturing state at steps S304, S308, S309, S311 and S312 in the flowchart shown in FIG. 3, the determination of the image capturing state is not necessarily needed. That is, the setting of the movable amount of the correction lens 103 at each of the above steps is only necessary. This also applies to Embodiment 2 described later.

Embodiment 2

Figure 6:
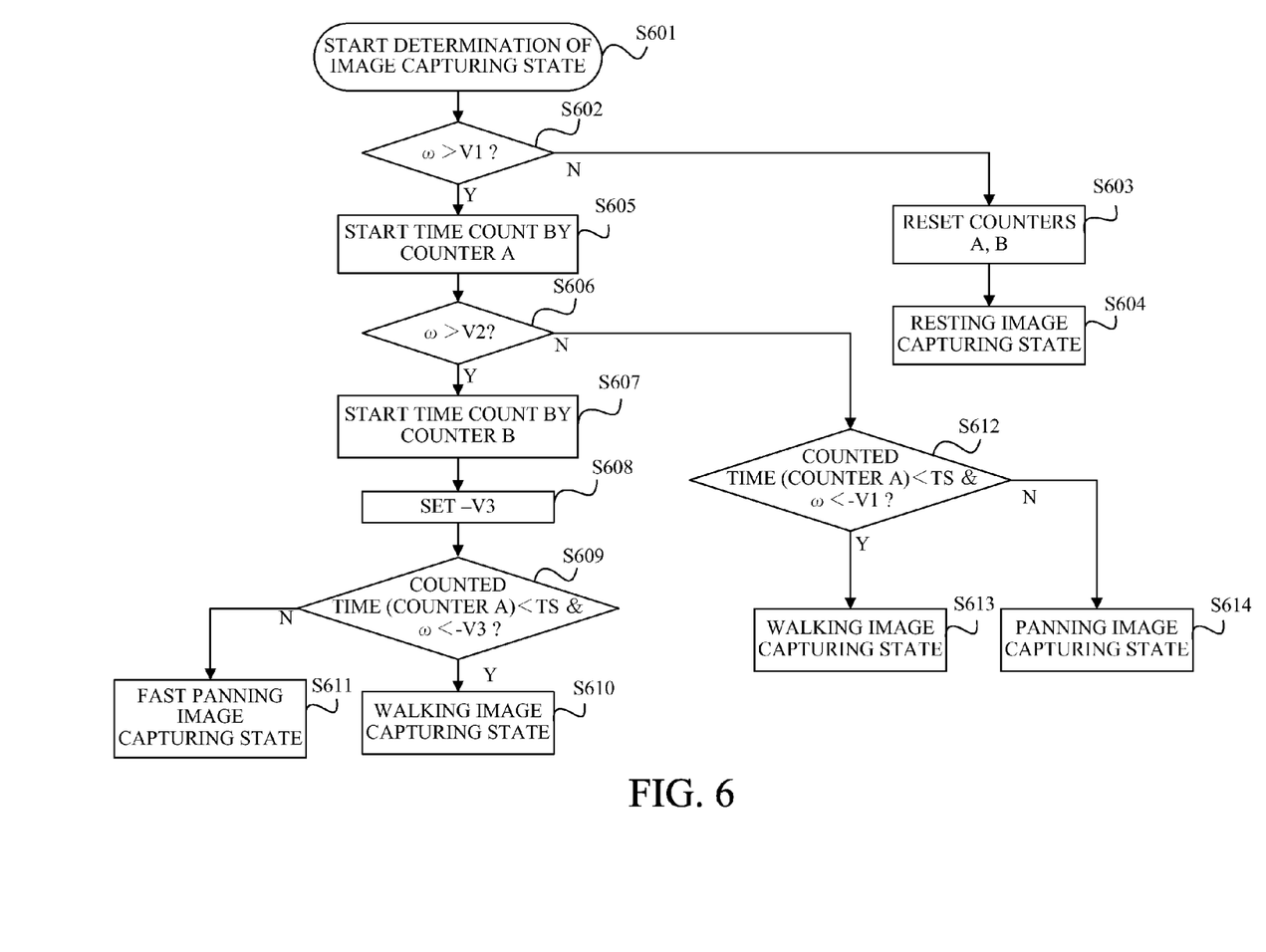
FIG. 6 is a flowchart showing an image capturing state determination process in Embodiment 2 of the present invention.

Next, description will be made of a second embodiment (Embodiment 2) of the present invention. A configuration of a camera including an optical image stabilizer of this embodiment is same as that of Embodiment 1. A flowchart of FIG. 6 shows an image capturing state determination process performed by an image capturing state determiner 136 in this embodiment. The image capturing state determiner 136 (image stabilization processor 13) performs this process according to part of an image stabilization process program as a computer program stored in a memory, as well as in Embodiment 1.

The image capturing state determiner 136 starts the image capturing state determination process at step S601, and then determines whether or not an angular velocity ω that is a value of an angular velocity signal exceeds a threshold V1 (first value) at step S602. If the angular velocity ω does not exceed the threshold V1, the image capturing state determiner 136 proceeds to step S603 to reset a counter A for measuring time after the angular velocity ω exceeds the threshold V1 and a counter B for measuring time (second period of time) after the angular velocity ω exceeds a threshold V2 described later. Then, the image capturing state determiner 136 proceeds to step S604 to determine that a current image capturing state is the resting image capturing state described in Embodiment 1.

On the other hand, if determining that the angular velocity ω exceeds the threshold V1 at step S602, the image capturing state determiner 136 proceeds to step S605 to cause the above-mentioned counter A to start counting of time. Then, at step S606, the image capturing state determiner 136 determines whether or not the angular velocity ω exceeds the threshold V2 (second value) whose polarity (or sign) is same as that of the threshold V1 and whose absolute value is greater than that of the threshold V1.

If the angular velocity ω does not exceed the threshold V2, the image capturing state determiner 136 proceeds to step S612 to determine whether or not a counted time counted by the counter A is within a predetermined period of time (first period of time) TS and whether or not the angular velocity ω exceeds a threshold −V1 (third value) whose polarity is opposite to that of the threshold V1. An absolute value of the threshold −V1 may be equal to or different from (close to) that of the threshold V1. If the angular velocity ω exceeds the threshold −V1, the image capturing state determiner 136 proceeds to step S613 to determine that the current image capturing state is the walking image capturing state described in Embodiment 1. On the other hand, if the angular velocity ω does not exceed the threshold −V1, the image capturing state determiner 136 proceeds to step S614 to determine that the current image capturing state is the panning image capturing state described in Embodiment 1.

If the angular velocity ω exceeds the threshold V2 at step S606, the image capturing state determiner 136 proceeds to step S607 to cause the above-mentioned counter B to start counting of time. Then, at step S608, the image capturing state determiner 136 sets a threshold −V3 (fourth value) depending on a counted value (second period of time) counted by the counter B. Specifically, the image capturing state determiner 136 increases an absolute value of the threshold −V3 as the counted time counted by the counter B becomes longer (that is, as the second period of time becomes longer). This is because, as the period of time (from TP3 to TP4) in which panning is first performed becomes longer, an angular velocity when panning in a reverse direction is performed is often increased and therefore it is necessary to deal with such a case.

Next, at step S609, the image capturing state determiner 136 determines whether or not the counted time counted by the counter A is within the predetermined period of time TS and whether or not the angular velocity ω exceeds the threshold −V3 whose polarity is opposite to that of the threshold V2 and whose absolute value is greater than that of the threshold −V1. An absolute value of the threshold −V3 may be equal to or different from (close to) that of the threshold V2. If the angular velocity ω exceeds the threshold −V3, the image capturing state determiner 136 proceeds to step S610 to determine that the current image capturing state is the walking image capturing state. On the other hand, if the angular velocity ω does not exceed the threshold −V3, the image capturing state determiner 136 proceeds to step S611 to determine that the current image capturing state is the panning (fast panning) image capturing state described in Embodiment 1.

Figure 5:
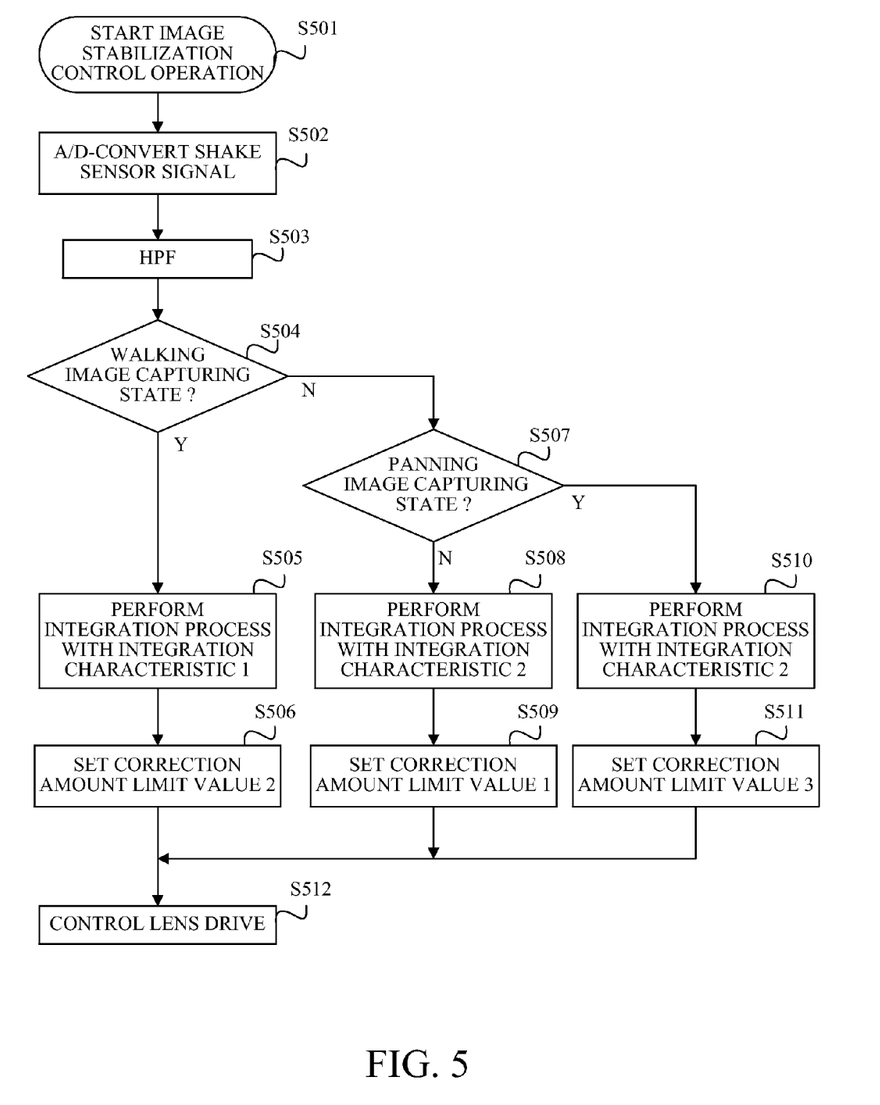
FIG. 5 is a flowchart showing an image stabilization process in Embodiment 1.

The image stabilization processor 13 performs the image stabilization control operation described in Embodiment 1 by using the flowchart shown in FIG. 5 according to the determination result by the above-described image capturing state determination process.

This embodiment changes, when the fast panning is performed, the threshold −V3 depending on the period of time during which the fast panning is performed (that is, a period of time during which the angular velocity ω exceeds the threshold V2). This change of the threshold −V3 more surely enables prevention of erroneous determination that the fast panning image capturing state is determined as the walking image capturing state, as compared with Embodiment 1. Moreover, as well as in Embodiment 1, this embodiment also sets a larger movable amount of the correction lens 103 in the walking image capturing state than that in the resting image capturing state and thereby can correct even a large image blur that may be caused in the walking image capturing state well.

Although each of the above embodiments described the case of treating the large camera shake in which the polarity of the angular velocity is alternately reversed (hereinafter referred to as "large amplitude reciprocating shake") as the camera shake generated in the walking image capturing state, such large amplitude reciprocating shake may be generated not only in the walking image capturing state, but also in a state in which image capturing is performed in a moving vehicle (hereinafter referred to as "an in-vehicle image capturing state"). Thus, it is not necessarily needed to determine that a state in which the large amplitude reciprocating shake is generated is the walking image capturing state. Furthermore, the walking image capturing state and the in-vehicle image capturing moving may be distinguished from each other by features in changes of the angular velocity in these image capturing states.

Moreover, each of the above embodiments described the case of determining the image capturing state based on whether or not the angular velocity exceeds, within the predetermined period of time counted from a time point at which the angular velocity exceeds the threshold, the other threshold having the opposite polarity to that of the previous threshold. However, the time point at which the counting of the predetermined period of time is started is not limited thereto as long as after the angular velocity exceeds the previous threshold. For example, the counting of the predetermined period of time may be started from a time point at which the angular velocity passes, after exceeding a threshold once, the same threshold again, and the image capturing state may be determined based on whether or not the angular velocity exceeds another threshold whose polarity is opposite to that of the previous threshold within the predetermined period of time. In addition, the counting of the predetermined period of time may be started from a time point at which the angular velocity exceeds a threshold and further reaches its peak, and the image capturing state may be determined based on whether or not the angular velocity exceeds another threshold whose polarity is opposite to that of the previous threshold within the predetermined period of time.

Moreover, although each of the above embodiments described the case of using the angular velocity signal after passing the HPF for determining the image capturing state, other signals may be used. For example, the angular velocity signal before passing the HPF or the angular displacement signal after passing the integration filter may be used for determining the image capturing state.

Furthermore, although each of the above embodiments described the case of shifting the correction lens 103 as the image stabilizing element, the image sensor 11 photoelectrically converting the object image may be shifted as the image stabilization element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-267383, filed on Dec. 6, 2011, which is hereby incorporated by reference herein in its entirety.

What is claimed is:

1. An optical image stabilizer configured to move an image stabilizing element in order to reduce image blur caused by a shake of an optical apparatus provided with the optical image stabilizer, the optical image stabilizer comprising:
  a shake detector configured to output a detection signal corresponding to magnitude of the shake of the optical apparatus; and
  a controller configured to change a movable amount of the image stabilizing element from a center of its movable range according to a value of the detection signal,
  wherein the controller is configured (a) to set the movable amount to a first movable amount when the value of the detection signal does not exceed a first value,
  (b) to set the movable amount to a second movable amount larger than the first movable amount when the value of the detection signal exceeds the first value and then exceeds, without exceeding a second value whose polarity is same as that of the first value and whose absolute value is greater than that of the first value, a third value whose polarity is opposite to that of the first value within a first period of time,
  (c) to set the movable amount to a third movable amount equal to or smaller than the first movable amount when the value of the detection signal exceeds the first value and then does not exceed the second and third values within the first period of time,
  (d) to set the movable amount to the second movable amount when the value of the detection signal exceeds the first value, then exceeds the second value and thereafter exceeds a fourth value whose polarity is opposite to that of the second value and whose absolute value is greater than that of the third value within the first period of time, and
  (e) to set the movable amount to the third movable amount when the value of the detection signal exceeds the first value and then exceeds the second value without exceeding the fourth value within the first period of time.

2. An optical image stabilizer according to claim 1, wherein the controller is configured to measure a second period of time during which the value of the detection signal exceeds the second value, and to set the fourth value depending on the measured second period of time.

3. An optical image stabilizer according to claim 1, wherein the third movable amount is smaller than the first movable amount.

4. An optical image stabilizer according to claim 3, wherein the third movable amount is zero.

5. An optical apparatus comprising:
  a body of the apparatus; and
  an optical image stabilizer provided in the body and configured to move an image stabilizing element in order to reduce image blur caused by a shake of the optical apparatus,
  wherein the optical image stabilizer comprising:
  a shake detector configured to output a detection signal corresponding to magnitude of the shake of the optical apparatus; and
  a controller configured to change a movable amount of the image stabilizing element from a center of its movable range according to a value of the detection signal,
  wherein the controller is configured (a) to set the movable amount to a first movable amount when the value of the detection signal does not exceed a first value,
  (b) to set the movable amount to a second movable amount larger than the first movable amount when the value of the detection signal exceeds the first value and then exceeds, without exceeding a second value whose polarity is same as that of the first value and whose absolute value is greater than that of the first value, a third value whose polarity is opposite to that of the first value within a first period of time,
  (c) to set the movable amount to a third movable amount equal to or smaller than the first movable amount when the value of the detection signal exceeds the first value and then does not exceed the second and third values within the first period of time,
  (d) to set the movable amount to the second movable amount when the value of the detection signal exceeds the first value, then exceeds the second value and thereafter exceeds a fourth value whose polarity is opposite to that of the second value and whose absolute value is greater than that of the third value within the first period of time, and (e) to set the movable amount to the third movable amount when the value of the detection signal exceeds the first value and then exceeds the second value without exceeding the fourth value within the first period of time.

6. An optical image stabilizer configured to move an image stabilizing element in order to reduce image blur caused by a shake of an optical apparatus provided with the optical image stabilizer, the optical image stabilizer comprising:
- a shake detector configured to output a detection signal corresponding to magnitude of the shake of the optical apparatus; and
- a controller configured to change a movable amount of the image stabilizing element from a center of its movable range according to a value of the detection signal,
- wherein the controller is configured (a) to set the movable amount to a reference movable amount when the value of the detection signal does not exceed a first value,
- (b) to set the movable amount to a movable amount equal to or smaller than the reference movable amount when the value of the detection signal exceeds the first value and then does not exceed, without exceeding a second value whose polarity is same as that of the first value and whose absolute value is greater than that of the first value, a third value whose polarity is opposite to that of the first value within a first period of time, and
- (c) to set the movable amount to a movable amount equal to or smaller than the reference movable amount when the value of the detection signal exceeds the first value, then exceeds the second value and thereafter does not exceed a fourth value whose polarity is opposite to that of the second value and whose absolute value is greater than that of the third value within the first period of time.

7. An optical image stabilizer according to claim 6, wherein the controller is configured to measure a second period of time during which the value of the detection signal exceeds the second value, and to set the fourth value depending on the measured second period of time.

8. An optical image stabilizer according to claim 6, wherein the controller is configured to set the movable amount to zero when the value of the detection signal exceeds the first value and then does not exceed the second value and the third value within the first period of time.

9. An optical image stabilizer according to claim 6, wherein the controller is configured to set the movable amount to zero when the value of the detection signal exceeds the first value and then exceeds the second value without exceeding the fourth value within the first period of time.

10. An optical apparatus comprising:
- a body of the apparatus; and
- an optical image stabilizer provided in the body and configured to move an image stabilizing element in order to reduce image blur caused by a shake of the optical apparatus,
- wherein the optical image stabilizer comprising:
- a shake detector configured to output a detection signal corresponding to magnitude of the shake of the optical apparatus; and
- a controller configured to change a movable amount of the image stabilizing element from a center of its movable range according to a value of the detection signal,
- wherein the controller is configured (a) to set the movable amount to a reference movable amount when the value of the detection signal does not exceed a first value,
- (b) to set the movable amount to a movable amount equal to or smaller than the reference movable amount when the value of the detection signal exceeds the first value and then does not exceed, without exceeding a second value whose polarity is same as that of the first value and whose absolute value is greater than that of the first value, a third value whose polarity is opposite to that of the first value within a first period of time, and
- (c) to set the movable amount to a movable amount equal to or smaller than the reference movable amount when the value of the detection signal exceeds the first value, then exceeds the second value and thereafter does not exceed a fourth value whose polarity is opposite to that of the second value and whose absolute value is greater than that of the third value within the first period of time.

* * * * *